United States Patent [19]

Kurita et al.

[11] Patent Number: 4,665,040
[45] Date of Patent: May 12, 1987

[54] ALUMINA-ZIRCONIA CERAMIC POWDERS AND A METHOD OF MAKING THE SAME

[75] Inventors: Ryuichi Kurita; Saburo Hori, both of Iwaki, Japan

[73] Assignee: Kureha Chemical Industry Co., Ltd., Tokyo, Japan

[21] Appl. No.: 680,297

[22] Filed: Dec. 10, 1984

[30] Foreign Application Priority Data

Dec. 19, 1983 [JP] Japan ................................. 58-237882

[51] Int. Cl.$^4$ ....................... C04B 35/48; C04B 35/10
[52] U.S. Cl. .................................... 501/105; 501/127; 501/153; 423/600; 423/608
[58] Field of Search ....................... 501/105, 153, 127; 423/608, 600

[56] References Cited

U.S. PATENT DOCUMENTS

| | | | |
|---|---|---|---|
| 4,298,385 | 11/1981 | Claussen et al. | 501/105 |
| 4,331,048 | 5/1982 | Dworak et al. | 501/105 |
| 4,396,724 | 8/1983 | Burden | 501/105 |
| 4,491,482 | 1/1985 | Hori | 501/105 X |
| 4,506,024 | 3/1985 | Claussen et al. | 501/105 |
| 4,520,114 | 5/1985 | David | 501/104 X |
| 4,532,224 | 7/1985 | Hori | 501/153 X |

OTHER PUBLICATIONS

Ito et al, "Unidirectly Solidified Transparent Ceramics in the System NaWbO$_3$—BaTiO$_3$", Am. Ceramic Society Bulletin, 58 [6] 591-596, (1979).
Hori et al., "Al$_7$O$_3$—ZrO$_2$ Ceramics Prepared from CVD Powders", Advances in Ceramics, American Ceramic Society, vol. 11, (1984).
Fukunaba, "Improvement of Fracture Toughness Ceramics", Bulletin of the Ceramic Society of Japan, vol. 17, (1982).
Passmore et al., "Strength—Grain Size—Porosity Relations in Alumina", J. Am. Ceramic Society, 48 [1]1-7, (1965).
Scott et al., "Effect of Laundering and Milling on the Sintering Behavior of Stabilized ZrO$_2$ Powders", Am. Ceramic Society Bulletin, 58[6]587-590, (1979).
Kagawa et al., "Stability of Ultrafine Tetragonal ZrO$_2$ Coprecipitated with AlZO$_3$ by the Spra-ICP Technique", J. Am. Ceram. Soc., 66(11) 751-753, (1983).
Kato et al., "Preparation of Finely Divided Alumina by Vapor Phase Reaction r Between Alumina Chloride and Oxidizing Gases, and its Properties", 21(6) 540-543, (1972).
McPherson, "Formation of Metastable Phases in Flame and Plasma Prepared Alumina", J. Mater. Sci., 8(6) 851-858, (1973).
Gitzen, "Alumina as a Ceramic Material", American Ceramic Society, (1970).

Primary Examiner—William R. Dixon, Jr.
Assistant Examiner—Karl Group
Attorney, Agent, or Firm—Wenderoth, Lind & Ponack

[57] ABSTRACT

Alumina-zirconia ceramic powders comprise from 10% to 25% by weight of zirconium oxide having specific crystalline phases and from 75% to 90% by weight of aluminum oxide having specific crystalline phases, and have an average particle size of no more than 1,000 Ångstroms and a two-phase structure wherein the zirconium oxide phase is dispersed in the aluminum oxide phase. A method of making such alumina-zirconia ceramic powders comprises the steps of suspending composite powders having a specific chemical composition and a specific average particle size in water to form a slurry, freeze-drying the slurry, and calcining the freeze-dried powder at atmospheric pressure in air at a temperature of from 800° C. to 1,250° C.

5 Claims, 5 Drawing Figures

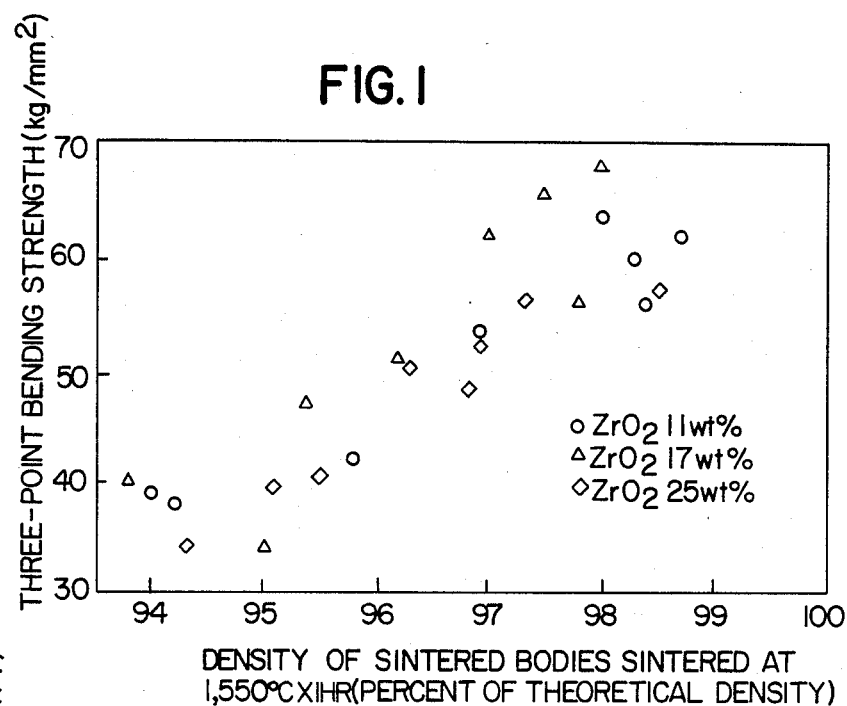
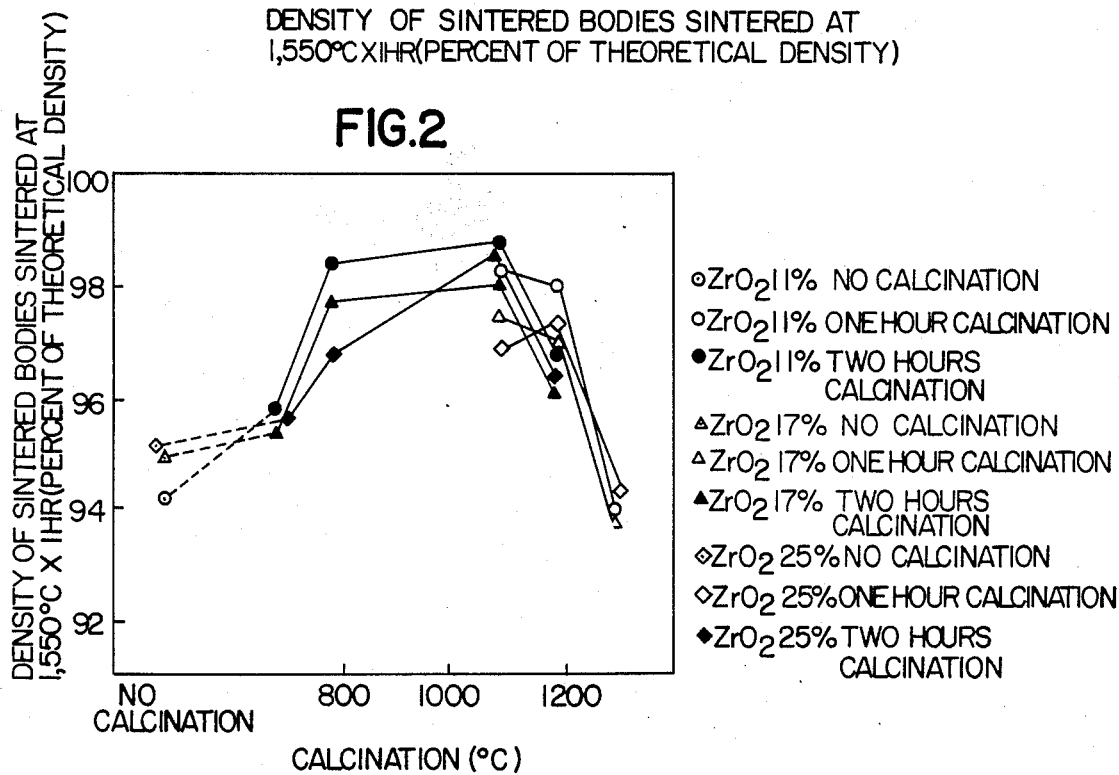

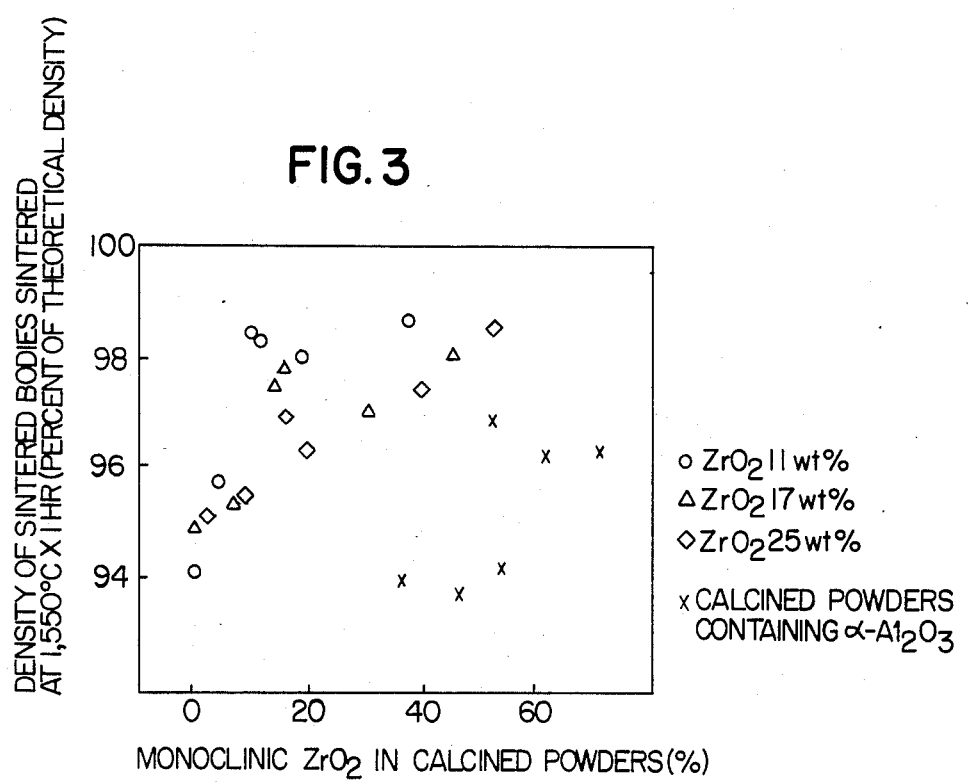
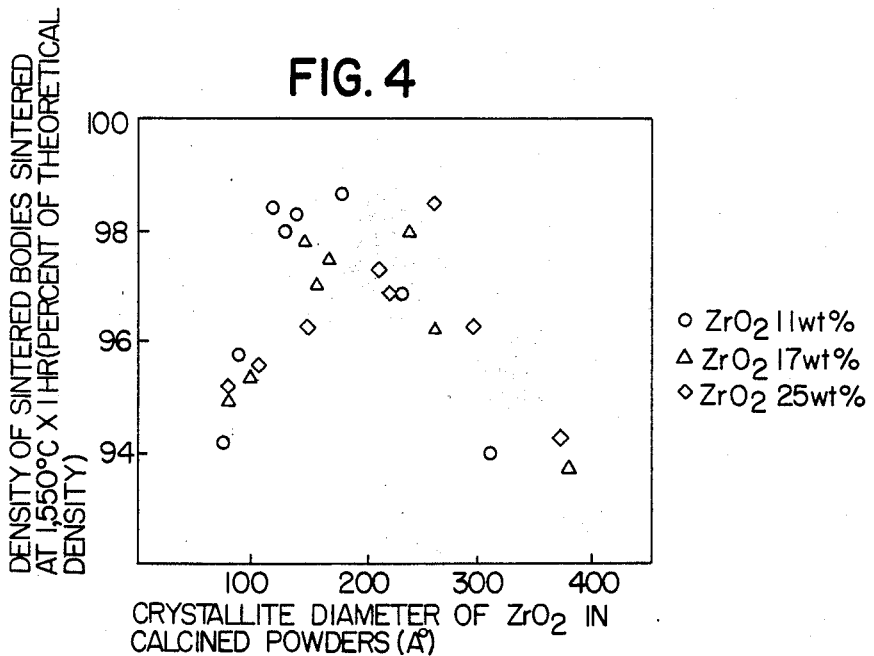

ALUMINA-ZIRCONIA CERAMIC POWDERS AND A METHOD OF MAKING THE SAME

BACKGROUND OF THE INVENTION

This invention relates to alumina-zirconia ceramic powders having excellent sinterability and a method of making the same. More particularly, this invention provides an excellent starting material for alumina-zirconia ceramic sintered bodies wherein alumina-zirconia ceramic powders having adjusted crystalline phases and a lower content of chlorine ion are obtained by calcining, under specific conditions, composite ceramic powders having dispersed zirconium oxide (zirconia) in aluminum oxide (alumina) based fine particles which are obtained by subjecting aluminum chloride and zirconium chloride as feedstocks to a vapor phase oxidation/pyrolysis process, and wherein when such ceramic powders are used as a starting material to produce molded sintered bodies the sintering initiation temperature can be reduced and the mechanical strength of the sintered bodies can be improved because the transfer and growth of zirconia particles as well as the phase transition of zirconia and alumina can be appropriately adjusted.

In the production of ceramic sintered bodies, the nature of starting powders is important and the control of the crystalline phase of the powders is one of the important factors. In the present invention, good sinterability is afforded by controlling the crystalline phases of the starting powders in the production of sintered bodies comprising alumina and zirconia. We have now found calcination conditions required for affording such crystalline phases. Further improvement in sinterability has been made by preventing the agglomeration during the powder pretreatment, especially by adopting the freeze-drying process. As a result, according to the present invention, the densities of the sintered bodies have become higher and the strengths of the sintered bodies have been greatly improved.

The chemical properties of zirconium are very similar to those of hafnium and therefore it is difficult to separate these two elements. Zirconium usually contains from about 1 to 4 mole % of hafnium. (For example, "7680 Chemical Goods" published by Kagaku Kogyo Nipposha, Japan, pp 155, 1980) Accordingly, when commercially available zirconium chloride is used in producing ceramic powders of the present invention, zirconium chloride used contains from about 1 to 4 mole % of hafnium chloride and zirconium oxide (zirconia) present in ceramic powders also contains from about 1 to 4 mole % of hafnium oxide (hafnia). The behavior of hafnium tetrachloride and that of hafnia obtained by oxidizing hafnium tetrachloride are essentially the same as that of zirconium tetrachloride and of zirconia, respectively. If the content of hafnium is no more than 4 mole %, it may be considered that zirconium containing hafnium exhibits the same behavior as that of pure zirconium in usual use.

When the zirconium component is called merely zirconium oxide or zirconia in the present invention unless otherwise indicated, the zirconium component generally contains no more than 4 mole % of hafnium oxide derived inevitably from the feedstock. Of course, pure zirconium oxide can be used in the present invention.

The toughness of sintered bodies can be significantly improved by finally dispersing zirconia in another ceramic matrix. (For example, "Bulletin of the Ceramic Society of Japan", Vol. 17 (1982), No. 2, pp. 106–111) The reason why toughness is generated is as follows: when sufficiently finely dispersed zirconia paticles are present in the form of the tetragonal phase in a ceramic matrix, these tetragonal zirconia particles transform into the monoclinic phase in the stress field at the tip of propagating cracks and thus absorb energy of crack propagation. In order that zirconia retains the tetragonal phase in the ceramic matrix, its size must be smaller than a critical particle size. For example, when zirconia is present in a dense alumina matrix, it is said that the critical particle diameter of zirconia is approximately 0.5 $\mu$m (5000 Ångstroms). If zirconia particles having a size larger than the critical particle diameter are present in a monoclinic symmetry, the transformation of crystalline phase due to crack propagation does not occur and thus toughness is not enhanced. Accordingly, when the ceramic sintered bodies are toughened by means of such zirconia particles, it is important that zirconia particles are uniformly and finely dispersed.

One of the present inventors has already carried out studies wherein gases of aluminum chloride and zirconium chloride are oxidized in a high temperature flame. Japanese Patent Appln. No. 3336/1983 disclosed that composite ceramic powders having finely dispersed tetragonal zirconia crystallites in alumina particles are produced by simultaneously blowing a mixed gas of aluminum chloride and zirconium chloride into a reaction vessel. The above Patent Application disclosed that the sintered bodies obtained from these powders have high bending strength. This is because the starting powders exhibited the extremely fine dispersion of zirconia in alumina and therefore the resulting sintered bodies also exhibited good dispersion of zirconia.

Studies have been carried out with respect to the densification behavior of these powders and the transitions of crystalline phases of zirconia associated with sintering at atmospheric pressure. Even though the starting powders exhibit uniform dispersion of zirconia, the powder having high content of zirconia cannot afford sintered bodies having desired crystalline phase. When the starting powders having high content of zirconia are sintered at high temperatures, zirconia grains coalesce and grow to a size larger than the critical particle diameter and thus monoclinic zirconia particles are formed. If the sintering temperature can be lowered, the increase of monoclinic zirconia accompanied with the grain growth is suppressed. It has been found effective to ball-mill the composite powders in ethanol with a non-ionic surfactant added, for preventing the agglomeration during the successive drying step and thus for lowering the sintering temperature (S. Hori et al, "Al$_2$O$_3$—ZrO$_2$ Ceramics Prepared from CVD Powders", Second International Conference on the Science and Technology of Zirconia, June 21–23, 1983, Stuttgart, West Germany; It will be recorded in "Advances in Ceramics", American Ceramic Society, Vol. 12 (1984)).

In general, if ceramics can be densified at a lower temperature not only the heat energy required for sintering can be saved, but also the mechanical properties of the sintered bodies can be improved. As sintering phenomenon is usually one wherein the disappearance of pores and grain growth occur at the same time, it is desirable if the pores disappear before significant and sometimes harmful grain growth occurs. If the densification is achieved at lower temperatures, therefore, dense sintered bodies having smaller grain sizes are produced. As can be seen from, for example, the data of Passmore et al (E. M. Passmore, R. M. Spriggs and T. Vasilos, "Strength-Grain Size-Porosity Relations in Alumina", J. Am. Ceram. Soc., 48 [1] 1–7 (1965)), the strength of sintered bodies depend largely upon the sintered grain sizes.

In sintered bodies wherein zirconia is dispersed in ceramic matrix, the low temperature sintering can improve the strength of the sintered bodies not only because of the smaller sintered grain sizes, but also because the zirconia particles can remain smaller than the critical particle diameter and retain tetragonal symmetry. Then the toughening effect due to the transformation of zirconia can be effectively utilized. Accordingly, in the case of ceramic powders containing zirconia, it is particularly improtant to improve the sinterability and to achieve the low temperature sintering.

In order to improve the sinterability of the alumina-zirconia composite powders produced by using chlorides as feedstocks, the process as already described was effective wherein the powders were ball-milled in alcoholic solvent with a surfactant. Similar effects were obtained when the alcohol was replaced by water as the solvent.

When such ball-milled powders were dried by means of three processes, i.e., a rotary evaporator drying process, a spray drying process and a freeze drying process, the freeze drying process afforded the best sinterability, the spray drying process afforded the next best sinterability and the rotary evaporation drying process afforded the worst sinterability.

The improvement of sinterability is also achieved by removing residual chlorine ion ($Cl^-$) from the powders. As can be seen from, for example, C. E. Scott and J. S. Reed, "Effect of Laundering and Milling on the Sintering Behavior of Stabilized ZrO Powders", Am Ceram. Soc. Bull., 58 [6] 587–590 (1979), if $Cl^-$ is present, the initiation temperature of sintering is considerably high and thus a presence of $Cl^-$ is disadvantageous. Following the literature of Scott et al, the removal of $Cl^-$ by means of water washing was carried out by repeating about 6 times the operation wherein the powder was placed in water only by 0.5 wt % to the water, stirred an thereafter centrifuged to separate water and powder. Thus, such a process is extremely inefficient.

Further studies have been carried out with respect to means capable of removing $Cl^-$ other than water washing. As the result, it has been found that not only $Cl^-$ is removed, but also that the transfer and growth of zirconia particles as well as the phase transition of zirconia and alumina occur by means of calcination. It has been also found that good sinterability which could not be achieved by the water washing can be achieved by appropriately controlling the calcination conditions.

SUMMARY OF THE INVENTION

An objective of the present invention is to provide alumina-zirconia ceramic powders having the following characteristics.

And another objective of the present invention is to provide a method of making alumina-zirconia ceramic powders having the following characteristics.

When powders comprising zirconia finely dispersed in fine particles of alumina according to Japanese Patent Appln. No. 3336/1983 are used as starting powder and such powders are molded and sintered to produce sintered bodies.

(1) it is necessary to prepare the powders of little agglomeration because the agglomeration leads to the coagulation of particles and then to the heterogeneous grain growth without achieving sufficient density, and (2) it is necessary to prepare the powders of high sinterability by adjusting the crystalline phases of alumina and zirconia and the crystalline size of zirconia, and by lowering the $Cl^-$ content to the minimum amount.

By providing these two characteristics to the powders, the low temperature sintering is made possible.

In the present invention, the method and conditions have been found experimentally to give these two characteristics to the powder, wherein the alumina-zirconia powder produced by the vapor phase oxidation/pyrolysis and collected in water is freeze-dried and then calcined at appropriate temperatures. Also in the present invention, the phases and composition of alumina and zirconia and the crystallite size of zirconia affording excellent sinterability have been specified.

The almina-zirconia ceramic powders according to the present invention comprises from 10% to 25% by weight of zirconium oxide consisting of from 10% to 55% by volume of monoclinic phase and from 45% to 90% by volume of tetragonal phase containing no more than 4 mole % of hafnium oxide, and from 75% to 90% by weight of aluminum oxide consisting of δ (delta) phase and θ (theta) phase and being free of α (alpha) phase, said crystalline phases of said zirconium oxide and aluminum oxide being determined by means of X-ray diffraction method, said alumina-zirconia ceramic powders exhibiting a two-phase structure wherein said zirconium oxide crystallites are disposed in said aluminum oxide particles and the average particle size of said aluminum-zirconia ceramic powders being no more than 1,000 Ångstroms.

Further, the method of making alumina-zirconia ceramic powders according to the present invention comprises the steps of providing powders of average particle size of no more than 1,000 Ångstroms comprising 75% to 90% by weight of aluminum oxide and from 10% to 25% by weight of zirconium oxide containing no more than 4 mole % of hafnium oxide which are obtained by subjecting aluminum chloride and zirconium chloride containing no more than 4 mole % of hafnium chloride as feedstocks to a vapor phase oxidation/pyrolysis process; suspending said powders in water to form an aqueous slurry having a solid concentration of from 9% to 25% by weight; freeze-drying said slurry; and calcining said freeze-dried powders at atmospheric pressure in air atmosphere at a temperature between 800° and 1,250° C.

BRIEF DESCRIPTION OF THE DRAWINGS

In the drawings:

FIG. 1 illustrates the correlation between the density relative to the theoretical one and the three-point bending strength of sintered bodies obtained in one example of the present invention;

FIG. 2 illustrates the relationship between the calcination temperature of alumina-zirconia ceramic powders and the density relative to its theoretical one of sintered bodies obtained by sintering the calcined powder;

FIG. 3 illustrates the relationship between the content of monoclinic zirconia in the calcined powders and the density relative to its theoretical one of sintered bodies obtained by sintering the calcined powders;

FIG. 4 illustrates the relationship between the crystallite diameter of tetragonal zirconia in the calcined powders and the density relative to its theoretical one of sintered bodies obtained by sintering the calcined powders.

DETAILED DESCRIPTION OF THE INVENTION

Figure 5:
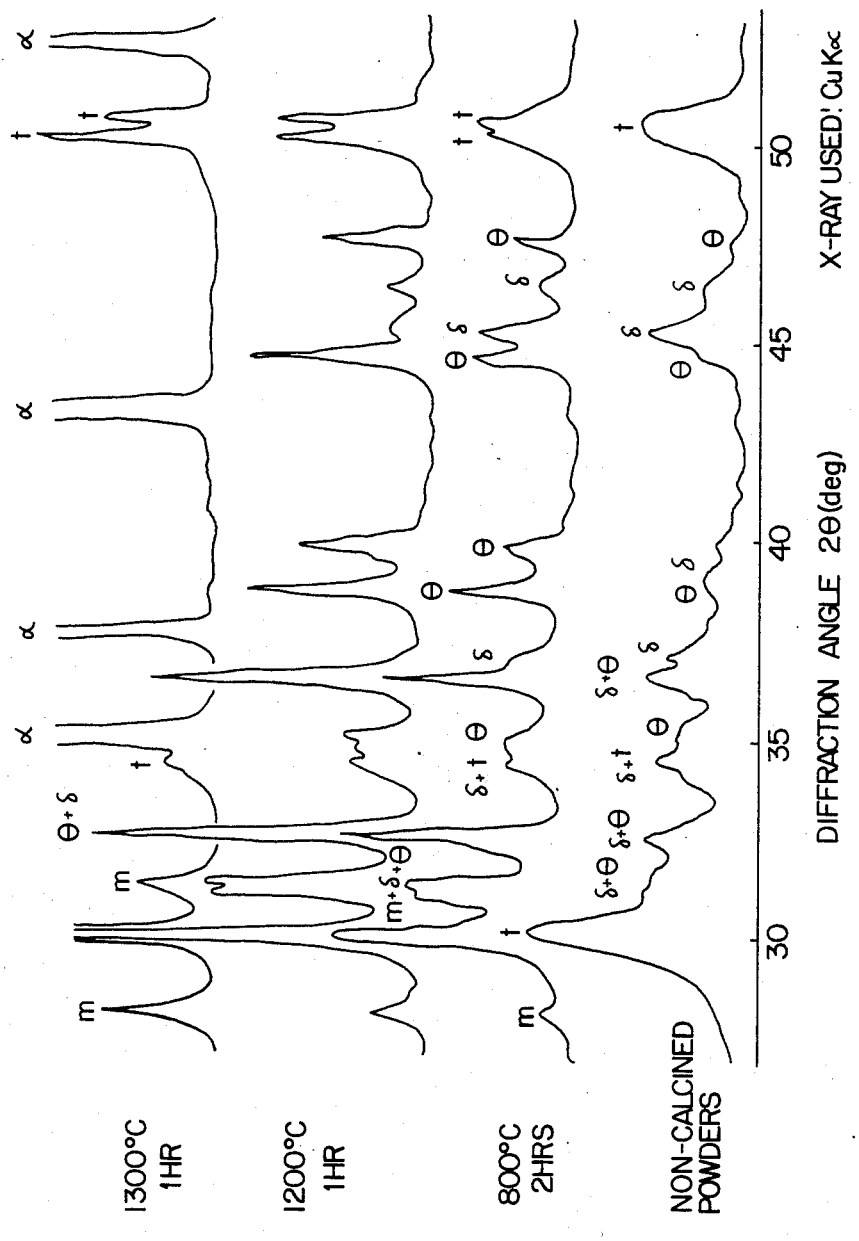
FIG. 5 illustrates the change of X-ray diffraction profiles, particularly of the crystalline phases, caused by calcining the alumina-zirconia ceramic powders produced by the chemical vapor deposition.

The method of making alumina-zirconia ceramic powders for the production of sintered bodies according to the present invention will be described in detail hereinafter.

As described in the previous sections the alumina-zirconia powders which are the starting materials of the present invention are obtained by using commercially available zirconium chloride containing from 1 to 4 mole % of hafnium chloride and aluminum chloride as feedstocks, blowing a mixed gas containing said feedstocks from appropriate evaporators capable of vaporizing respective chlorides with inert gas such as nitrogen into a burner combustion chamber wherein hydrogen-oxygen flame is formed, thereby to carry out simultaneously oxidation and pyrolysis of said hafnium chloride-containing zirconium chlorie and said aluminum chloride in a mixed state by means of burner flame of oxidizing atomosphere (Japanese Patent Appln. No. 3336/1983). The alumina-zirconia powders are composite powders comprising alumina and zirconia containing no more than 4 mole % of hafnia wherein tetragonal zirconia having crystallite diameter of from 40 to 80 Angstroms calculated from the width of the X-ray diffraction peak is finely dispersed in fine particles of alumina having average particle size of from 200 to 1,000 Ångstroms. While the blend ratio of zirconia to alumina can be ajusted by controlling the amount of feedstock zirconium chloride or aluminum chloride vaporized, the desired range of the zirconia content in the powders is from 10% to 25% by weight. When the amount of zirconia is less than 10% by weight, zirconia provides little toughness and the strength of sintered bodies is not sufficiently improved. When the amount of zirconia is more than 25% by weight, monoclinic phase tends to be formed.

The alumina-zirconia powders thus obtained are generally collected with water. The powders are present in water in a suspended state. Foreign matter is removed from the slurry through a sieve having the opening of 38 μm. If necessary, the solid concentration of the slurry is adjusted to from 9% to 25% by weight by concentrating or diluting by adding water. The slurry is transferred to flasks and frozen in dry ice-methanol bath. The frozen matter is then dried for sufficient period of time under a pressure of no more than 1 Torr. with a freeze dryer equipped with vacuum pump and cold trap. In the previous experiments, it was proved that the wet ball-milling deagglomerated the powder and in addition that the freeze drying was most appropriate for preventing the agglomeration during the drying step after the ball-milling. The freeze drying was therefore attempted also for drying the collected slurry and proved to be more effective for preventing the agglomeration than other drying techniques in this step of the powder treatment as well as after the ball-milling. The freeze drying is continued until the moisture content of the powders as determined by the Karl Fischer method is 1.0% by weight or less. If the solid concentration in the slurry is from 9 to 25% by weight, several hours suffice the necessary dryness by this method.

The freeze-dried powders are calcined in air atmosphere for an appropriate period of time at an appropriate temperature by means of an electric furnace or the like.

It is necessary that time and temperature required for calcination are within the ranges determined from the results of Examples described hereinafter. The alumina-zirconia powders containing various contents of zirconia obtained by means of the chemical vapor deposition process, shown in the following Table 1 were calcined at various temperatures in an electric furnace for various periods of time. The calcined powders were ball-milled in water with a surfactant on the bases of the prior art discovery. The volatile matter was again removed by means of the freeze-drying process, and the dried powders were subjected to compaction by a conventional method. The compacted bodies were then dried for at least 2 days at a temperature of 120° C., and thereafter sintered for one hour in air atmosphere under atmospheric pressure at maximum temperature of 1,550° C. (This temperature is relatively low in obtaining alumina-zirconia sintered bodies) The physical properties of the sintered specimens were measured, and the effects of calcination conditions were evaluated. With respect to the properties of calcined powders associated with sintering treatment, the identifications of the crystalline phases of aluminum oxide and zirconium oxide were carried out by means of X-ray diffraction method. The quantitative analysis determining the fractions of monoclinic and tetragonal zirconium oxide was carried out by means of the method of Garvie et al. (R. C. Garvie and P. S. Nicholson, "Phase Analysis in Zirconia Systems", J. Am. Cerem. Soc., 55 [6] 303–305 (1972)) The cyrstallite diameter of zirconium oxide was determined by Scherrer's equation on the basis of the half value width of tetragonal phase (111). (The method is described, for example, in L. V. Azaroff "Elements of X-ray Crystallography", pp. 562–571, Maruzen (Japan) (1973) (translated by Hirabayashi and Iwasaki; the original text published by McGraw-Hill, New York (1968)).

The density of sintered bodies obtained by sintering the calcined powders according to the foregoing method was determined by the Archimedes method. The density of the sintered bodies was represented in percentage (%) as a relative density to the following theoretical density.

On the assumption that the specific gravity of alumina is 3.987 (assuming α-alumina) and the true specific gravity of zirconia is 6.097 (assuming tetragonal zirconia), the theoretical density is determined by the following equation:

$$\text{Theoretical density} = \frac{100}{\frac{\text{Alumina content (wt \%)}}{3.987} + \frac{\text{Zirconia content (wt \%)}}{6.097}}$$

$$\text{Relative density (\%)} = \frac{\text{Archimedean density}}{\text{Theoretical density}} \times 100$$

The density of the compacted body before sintering, in which the phase of alumina is δ and/or θ, was determined by the dimension and weight and represented relative to the theoretical density determined by the above equation except that the specific gravity of alumina is not 3.987 but 3.585. While the value of 3.585 used as the specific gravity of alumina is the specific gravity of θ-alumina, δ-alumina has essentially equal specific gravity and therefore this value was used.

The bending strength was determined according to JIS 1601 (bending strength test for fine ceramices) except that the span of three point bending was 16 mm instead of 30 mm and the dimension of the specimens was slightly smaller, i.e., about 3.7×3×20 mm.

Tables 1 and 2 and FIGS. 1–5 prepared for clarifying the results of Tables 1 and 2 exhibit the following:

(1) The calcination between 800° and 1,250° C. is effective to increase the density of sintered bodies. The calcination at 700° C., is in sufficient. When the calcination temperature is 1,300° C., a portion of alumina in the calcined powders is transformed into α-alumina. When such α-alumina particles are detected, the crystallite diameter of tetragonal zirconia is increased to 300 Ångstroms or above and the particle size observed by transmission electron microscopy is also increased. It is thought that such grain growth of alumina and zirconia accompanies partial coagulation, which in Turn, reduces the density of the sintered bodies and therefore lowers the bending strengths.

(2) As for the calcination time, 1–2 hours' calcination gives good results in the temperature range of 800°–1,250° C. But the tendency is observed that the longer calcination time, especially at higher temperatures than the above range, may cause the formation of α alumina and the growth of zirconia crystallites, resulting in poor sinterability.

Hereinafter, the present invention will be specifically described with respect to examples of practice thereof.

Example 1

As described in Japanese Patent Appln. No. 3336/1983, the alumina-zirconia ceramic powders comprising zirconia dispersed in fine particles of alumina and having zirconia content of 11%, 17% and 25% by weight were produced under the following production conditions, by means of an apparatus for producing comprising an evaporator for aluminium chloride, an evaporator for zirconium chloride, a reaction vessel, a scrubber and a gas-liquid separator wherein aluminum chloride and zirconium chloride fed from each evaporator with carrier gases are blown into a flame in the reaction vessel to carry out oxidation reactions of aluminum chloride and zirconium chloride, the resulting oxides are quenched and thereafter fed to the scrubber.

Production Conditions:

| | |
|---|---|
| Temperature of evaporator for aluminum chloride | 150° C. |
| Carrier gas (nitrogen) for aluminum chloride | 0.4 Nm³/Hr |
| Temperature of evaporator for zirconium chloride containing 1.5 mole % of hafnium chloride | |
| (a) Zirconium oxide content of 11% by weight | 273° C. |
| (b) Zirconium oxide content of 17% by weight | 282° C. |
| (c) Zirconium oxide content of 25% by weight | 294° C. |
| Carrier gas (nitrogen) for zirconium chloride | 0.1 Nm³/Hr |
| Gas for protection of blowing nozzle | 0.2 Nm³/Hr |
| Hydrogen for burner | 0.8 Nm³/Hr |
| Oxygen for burner | 0.7 Nm³/Hr |
| Reaction temperature | 1,250° C. |

The resulting powders were composite powders, as shown in "no calcination" of Table 1, having the crystalline phases of alumina and zirconia identified by means of X-ray diffraction method and the crystallite diameter of zirconia calculated from the half value width of a peak of tetragonal phase (111) by Scherrer's equation. The zirconia was 100% tetragonal and, alumina was mainly δ (delta)-alumina and free of α (alpha)-alumina. The crystallite diameter of zirconia was from 75 to 80 Ångstroms. When the composite powders were observed by means of a transmission electron microscopy, the average particle size of alumina was from 200 to 1000 Ångstroms.

As those powders were collected with water in a suspended state, the slurry was first filtered by a sieve having an opening of 38 μm to remove foreign materials and then placed on a hot plate to be concentrated. The slurry was adjusted to the solid concentration of from 10 to 30 grams per 100 cc of water, transferred to eggplant type flasks, and frozen in dry ice-methanol bath. The eggplant type flasks were then attached to a freeze dryer (manufactured by Labconco, USA type FD-12) and the frozen matter was treated for about 12 hours under 1 Torr. or lower pressure.

The dried powders were calcined in an electric furnace in air atmosphere under the various conditions as shown in Table 1. After the calcination, the identification of the crystalline phases of alumina and zirconia was carried out by means of X-ray diffraction method. The quantitative analysis determining the fractions of monoclinic and tetragonal zirconia was carried out by means of the method of Gravie et al. The crystallite diameter of zirconia was determined by using the Scherrer's equation from the half value width of the tetragonal (111) peak.

TABLE 1

Crystalline phases formed by calcination of Al₂O₃—ZrO₂ composite powders, and the relative density and bending strength of sintered bodies obtained by sintering the composite powders for one hour at 1,550 C. at atomospheric pressure

| | ZrO₂ 11% by weight | | | | | ZrO₂ 17% by Weight | | | | |
|---|---|---|---|---|---|---|---|---|---|---|
| | Crystalline phase | | Crystallite diameter | Sintered bodies | | Crystalline phase | | Crystallite diameter | Sintered bodies | |
| Calcination conditions | Al₂O₃ δ θ | ZrO₂ | of ZrO₂ | Density | Bending strength | Al₂O₃ | ZrO₂ | of ZrO₂ | Density | Bending strength |
| No calcination | (vw) | t | 75Å | 94.2% | 38 Kg/mm² | δ | t | 80Å | 95.0% | 34 Kg/mm² |
| 700° C. 2 hours | δ θ(vw) | m(4%) t | 90 | 95.8 | 42 | δ | m(7%) t | 100 | 95.4 | 47 |
| 800° C. 2 hours | δ θ | m(10) t | 120 | 98.4 | 56 | δ θ(w) | m(15) t | 150 | 97.8 | 56 |
| 1,100° C. 1 hour | δ(w) θ | m(11) t | 140 | 98.3 | 60 | δ θ | m(14) t | 170 | 97.5 | 66 |
| 1,100° C. 2 hours | δ(w) θ | m(37) t | 180 | 98.7 | 62 | δ(w) θ | m(45) t | 240 | 98.0 | 68 |

TABLE 1-continued

Crystalline phases formed by calcination of $Al_2O_3$—$ZrO_2$ composite powders, and the relative density and bending strength of sintered bodies obtained by sintering the composite powders for one hour at 1,550 C. at atomospheric pressure

| 1,200° C. 1 hour | δ(vw) θ | m(19) t | 160 | 98.0 | 64 | δ(w) θ | m(30) t | 190 | 97.0 | 62 |
|---|---|---|---|---|---|---|---|---|---|---|
| 1,300° C. 1 hour | θ(vw) α | m(35) t | 310 | 94.0 | 39 | α | m(46) t | 380 | 93.8 | 40 |

|  | $ZrO_2$ 25% by weight | | | | |
|---|---|---|---|---|---|
|  | Crystalline phase | | Crystal-lite | Sintered bodies | |
| Calcination conditions No calcination | $Al_2O_3$ δ θ (vw) | $ZrO_2$ t | diameter of $ZrO_2$ 80Å | Density 95.1% | Bending strength 39 Kg/mm² |
| 700° C. 2 hours | δ θ(vw) | m(8%) t | 110 | 95.5 | 40 |
| 800° C. 2 hours | δ θ(w) | m(19) t | 150 | 96.8 | 48 |
| 1,100° C. 1 hour | δ θ | m(16) t | 220 | 96.9 | 52 |
| 1,100° C. 2 hours | (w) θ | m(52) t | 260 | 98.5 | 57 |
| 1,200° C. 1 hour | (w) θ | m(39) t | 220 | 97.3 | 56 |
| 1,300° C. 1 hour | α | m(54) t | 370 | 94.3 | 34 |

Note:
Crystalline phase: $Al_2O_3$ δ(delta), θ(theta), α(alpha); $ZrO_2$ m(monoclinic), t(tetragonal); w: weak; vw: very weak When the particle sizes of calcined powders were measured by transmission electron microscopy, the average particle sizes of powders obtained by calcining at a temperature up to 1,200° C. were not varied as compared to that before calcination.

300–400 cc of water and 0.5–1 gram of a non-ionic surfactant (Yukanol NCS manufactured by Tetsuno Yuka, K.K., Japan) were added to 100 grams of each of these calcined powders and non-calcined powders for comparison. The mixture was treated by a laboratory centrifugal ball mill (Pulverisette 6, manufactured by Fritsch FmbH, West Germany) with alumina jar and balls for one hour at rotation speed dial of 3.5. The purposes of this treatment are to disintegrate particles agglomerated by the calcination and to enhance the sinterability of the powders by mechanical stress, which gives so-called the mechanochemical effect to the powders.

The ball-milled suspension was again filtered by a sieve having 400 mesh in order to remove foreign matter and coarse particles, and transferred to an eggplant flask. The suspension was freeze-dried in the same manner as describe previously to obtain dried powders.

These dried powders were isostatically compacted at pressure of 2 tons per square centimeter. The compacted bodies were dried for at least 2 days at temperature of 120° C. and thereafter sintered for one hour in air atmosphere at atmospheric pressure at maximum temperature of 1,550° C.

The crystalline phases detected in the calcined powders, the volume percentage of monoclinic zirconia (remainder tetragonal zirconia), the crystallite diameter of zirconia (determined by diffraction peak of tetragonal (111)), and the density and bending strength (average) of sintered bodies are shown in Table.

In order to clarify these data further, the data are illustrated in FIGS. 1-4. First, FIG. 1 exhibits that there is strong correlation between the density and the three-point bending strength of sintered bodies. FIG. 2 exhibits the relationship between the calcination temperature and the density of sintered bodies. While the calcination at temperature of 800° C., 1,100° C. or 1,200° C. increased the density of sintered bodies, the calcination at temperature of 700° C. appeared insufficient and the calcination at temperature of 1,300° C. appeared excessive.

As can be seen from the crystalline phases of powders wherein good sinterability is afforded by calcination, the alumina is mixture of δ (delta)-alumina and θ (theta)-alumina, as well as the zirconia is mixture of monoclinic (m) zirconia and tetragonal(t) zirconia and the crystallite diameter of tetragonal zirconia is no more than 300 Ångstroms. FIG. 3 exhibits the relationship between the percent (%) of monoclinic $ZrO_2$ in calcined powders and the density of sintered bodies. Powders free of α-alumina and containing from 10% to 55% of monoclinic zirconia afforded high density. FIG. 4 exhibits that tetragonal zirconia having crystallite diameter of from 120 to 300 Ångstroms afforded high density of sintered bodies. In the case of tetragonal zirconia having crystallite diameter of more than 300 Ångstroms, α-alumina was always detected.

The change of the crystalline phase due to th calcination can be clearly shown by X-ray diffraction patterns. FIG. 5 shows X-ray diffraction patterns of powders having zirconium content of 11% by weight. As the calcination temperature was raised from 800° C. to 1200° C., several changes occurred at the same time δ-alumina gradually decreased, θ-alumina increased, monoclinic zirconia gradually increased, the tetragonal peak became sharp, and the size of crystallite increased. The observations by transmission electron microscopy revealed that the particle sizes of the composite powders were scarecely changed. Therefore the changes of X-ray diffraction patterns can be attributed to the phase transition and mass transfer within the particles.

The drastic phase changes occured at calcination temperature between 1,200° C. and 1,300° C. All alumina transformed to α-alumina, monoclinic zirconia significantly increased and the crystallite diameter drastically increased. The observations by transmission electron microscopy revealed that the particles coagulated considerably. Dense compacted bodies could not be formed from these coagulated particles and therefrom the sinterability was low. In the case of calcination temperature of 1,300° C., the crystallite diameter of zirconia calculated from the peak width of X-ray diffraction was more than 300 Ångstroms, the critical size for unconstrained zirconia particles. But a large fraction of zirconia crystallites still retained symmetry, which leads to the suggestion that they are more or less constrained by the alumina particles.

The sinterability of the alumina-zirconia composite powders produced by the chemical vapor deposition method can be improved by the calcination. While the exact reason of the improved sinterability is not clearly known, it is suggested that the sinterability can be enhanced by transforming a portion of δ-alumina into θ-alumina and a portion of tetragonal zirconia into monoclinic zirconia. It is also suggested that, if α-alumina is formed by calcining the powders at too high temperatures or for excessively long period of time, both alumina and zirconia exhibit considerable grain growth and partial coagulation, and therefore the sinterability is lowered.

The phase change of zirconia from tetragonal to monoclinic by calcination may be considered as a drawback because tetragonal zirconia enhances toughness, but monoclinic zirconia does not. This argument is not correct if the difference in the crytical diameters is taken into account between unconstrained zirconia particles an contrained ones. When zirconia particles or crystallites, whether tetragonal or monoclinic, are sintered together with alumina particles, they gradually become constrained by the alumina matrix and are coalesced to larger sizes. The important point is to control the size of zirconia particles after the sintering below the critical diameter. The critical particle size of zirconia contrained in the m matrix is approximately 0.5 μm, i.e., considerably larger as compared to the critical particle size (about 300 Ångstroms=0.03 μm) of unconstrained particles. Even though monoclinic zirconia particles nay be present in the calcined powders their sizes are sufficiently smaller as compared to the critical particle size (approximately 0.5 μm) of zirconia in the matrix and therefore the formation of monoclinic zirconia causes little problem. Rather, it should be pointed out that the sinterability is improved by the presence of monoclinic zirconia and therefore that the high density is achieved before significant grain growth occurs. Accordingly, the presence of monoclinic zirconia particles is advantageous because the zirconia particle sizes after sintering can be more easily retained smaller than the critical size of contrained zirconia particles.

Example 2

In order to examine the effect of residual chloride ion ($Cl^-$) on the sinterability, the alumina-zirconia ceramic powder (raw powder) containing 17% by weight of zirconia obtained in Example 1 was dispersed in deionized water to prepare a slurry having solid concentration of about 0.5% by weight, and repeatedly subjected to water washing with sufficient stirring and centrifugal separation 6 times. In comparison, the raw powder described above was freeze-dried in the same manner as described in Example 1, and thereafter calcined for 2 or 5 hours at temperature of 800° C. to prepare the calcined powders. The contents of residual chlorine ion present in the raw powder, the washed powder and the calcined powders were measured. These samples were than ball-milled, freeze-dried, compacted and thereafter sintered in the same manner as described in Example 1. The densities and bending strengths of the sintered bodies were determined. The results obtained are shown in Table 2.

TABLE 2

Effect of method and extent of chlorine ion removed from powder on density and bending strength of sintered bodies

| | | Sintered bodies | |
|---|---|---|---|
| | Residual Cl (ppm) | Density (percent of theoretical density) | Bending strength ($kg/mm^2$) |
| Raw powder | 784 | 95.0 | 34 |
| Water washed powder | 30 | 97.0 | 51 |
| Calcined powders | | | |
| (1) 800° C., 2 hours | 46 | 97.8 | 56 |
| (2) 800° C., 5 hours | 8 | 98.2 | 64 |

Note: composite powder containing 17% by weight of zirconia was used.

Table 2 shows that the $Cl^-$ content of the raw powder was significantly higher than these of the calcined powder and the water-washed powders. The crystalline phases of the raw powder were identical with those of the water-washed powder. The differences between the raw powder and the water washed powder in the density and bending strength of sintered bodies as shown in Table 2 were, therefore, not due to the crystallne phases, but due to the $Cl^-$ removal. As the powders calcined for 2 or 5 hours at temperature of 800° C. afforded higher density and higher strength of sintered bodies than the water-washed powder, the calcination appeared to enhance the sinterability not only because it removed the residual $Cl^-$ but also because the desirable crystalline phases were obtained by the calcination.

Example 3

The drying methods were compared in this example by starting from the slurry of the raw alumina-zirconia composite powder (17% by wt. % zirconia) whose solid concentration was adjusted to 10-30 grams per 100 cc of water as shown in Example 1. During the powder treatment before the compaction, there are two drying steps; before the calcination and after the ball-milling as already shown in Example 1. The densities of the compacted bodies and the sintered bodies as well as the bending strengths of the sintered bodies were; strongly influenced by the methods adopted for these two drying steps, as described in the following The drying methods compared were, evaporation by a rotary evaporator (type N-2, Tokyo Rikakikai Co., Ltd.), freeze-drying (FD-12, Labconco, U.S.A.) and spray-drying ("Mini-Spray", model DL-21, Yamato Scientific Co., Ltd.). Six experiments were conducted by changing the methods and combinations in the two drying steps as shown in Table 3. The calcining condition was 1,100° C., 2 hours and the other processing conditions were kept the same as in Example 1 except ethanol was used as the solvent for ball-milling in experiment No. 1 of this example.

As can be seen from the comparison of the data of experiment Nos. 1 and 2 shown in Table 3, there was no substantial difference between water and ethanol as the solvent for ball milling. As can be seen from the comparison of the data of experiment Nos. 2, 3 and 4, the freeze-drying both before calcination and after ball-milling was effective, but the one calcination appeared more effective than the other. As can be seen from the comparison of the data of experiments Nos. 4, 5 and 6, the freeze-drying was the best for the drying process after ball-milling, the spray-drying was the second and the rotary evaporator was the worst. The use of freeze-drying increased the density of compacted bodies, which apparently led to the increase of the density and strength of sintered bodies. It is thought that the powder agglomeration was prevented by the freeze-drying and therefore dense and uniform compacted bodies were formed.

TABLE 3

Influence of drying processes on density of compacted bodies, and density and bending strength of sintered bodies

| Experiment No. | Drying process before calcination | Solvent for ball milling after calcination | Drying process after ball milling | Density of compacted bodies (% of theoretical density) | Sintered bodies Density (% of theoretical density) | Bending strength (kg/mm$^2$) |
|---|---|---|---|---|---|---|
| 1 | Rotary evaporator | Ethanol | Rotary evaporator | 57.8 | 96.4 | 54 |
| 2 | Rotary evaporator | Water | Rotary evaporator | 57.7 | 96.8 | 52 |
| 3 | Rotary evaporator | Water | Freeze-drying | 58.6 | 97.2 | 58 |
| 4 | Freeze-drying | Water | Rotary evaporator | 59.4 | 97.5 | 62 |
| 5 | Freeze-drying | Water | Spray Drying | 60.3 | 97.5 | 65 |
| 6 | Freeze-drying | Water | Freeze-drying | 61.0 | 98.0 | 68 |

Notes:
Raw powder containing 17% by weight of zirconia was used; Calcination conditions: 1,100° C., 2 hours Alumina-zirconia ceramic powders having the specific component composition, crystalline phases and average particle size according to the present invention have excellent sinterability, therefore sintered bodies produced by using such powders as starting powders have high density and high bending strength.

Further, according to the present method, freeze-drying is used in drying powders and therefore the agglomeration of powders is little, the coagulation of particles is prevented during the calcination and the sinterability of the powders also improved. In addition, the calcination at appropriate temperatures removes chlorine ion contained in the powders and further improves the sinterability. Accordingly, it is possible to carry out the sintering at low temperatures. As the result, the grain growth is suppressed, and the size of zirconia particles is more easily retained smaller than the critical particle size. Accordingly, the alumina-zirconia ceramic powders haing excellent sinterability can be produced by the methods of the present invention.

The strength of sintered bodies prepared from the alumina-zirconia ceramic powders according to the present invention is higher than those of sintered bodies prepared from the prior art alumina powders alone, sintered bodies from mixture of alumina powders and zirconia powders, or sintered bodies prepared from the alumina-zirconia powders produced by the same chemical vapor deposition method but without appropriate powder treatment as defined in the present invention. The sintered bodies prepared from the alumina-zirconia ceramic powders according to the present invention have excellent mechanical properties, and can be used as materials for cutting tools, machine parts and other refractory hard materials.

What is claimed is:

1. Alumina-zirconia ceramic powders for use in the production of sintered bodies comprising from 10% to 25% by weight of zirconium oxide consisting of from 10% to 55% by volume of monoclinic phase and from 45% to 90% by volume of tetragonal phase, and from 75% to 90% by weight of aluminun oxide consisting of delta-phase as a minor phase and theta-phase as a major phase and being free of alpha-phase, said crystalline phases of said zirconium oxide and aluminum oxide being determined by means of the X-ray diffraction method, said alumina-zirconia ceramic powders exhibiting a two-phase structure wherein said zirconium oxide phase is dispersed in said aluminum oxide phase, and the average particle size of said alumina-zirconia ceramic powders being no more than 1,000 Ångstroms.

2. The alumina-zirconia ceramic powders according to claim 1 wherein the crystallite diameter of tetragonal zirconium oxide is from 120 to 300 Ångstroms on the basis of the calculation of the peak width of X-ray diffraction.

3. The alumina-zirconia ceramic powders according to claim 1 wherein the content of chlorine ion is no more than 500 ppm (on a weight basis).

4. A method of making alumina-zirconia ceramic powders which comprises the steps of providing powders of average particle size of no more than 1,000 Ångstroms comprising from 75% to 90% by weight of aluminum oxide consisting of delta-phase as a minor phase and theta-phase as a major phase and being free of alpha-phase and from 10% to 25% by weight of zirconium oxide consisting of from 10% to 55% by volume of monoclinic phase and from 45% to 90% by volume of tetragonal phase which are obtained by subjecting aluminum chloride and zirconium chloride containing no more than 4 mole % of hafnium chloride as feedstocks to a vapor phase oxidation/pyrolysis process; suspending said powders in water to form an aqueous slurry having solid concentration of from 9% to 25% by weight; freeze drying said slurry; and calcining said freeze-dried powders at atmospheric pressure in an air atmosphere at a temperature of from 1000° C. to 1,250° C.

5. The method of making alumina-zirconia ceramic powders according to claim 4 wherin said freeze-drying is carried out by freezing said powders in a dry ice-methanol bath and thereafter vacuum drying said powders under a pressure of no more than 1 Torr.

* * * * *